Patented Jan. 1, 1952

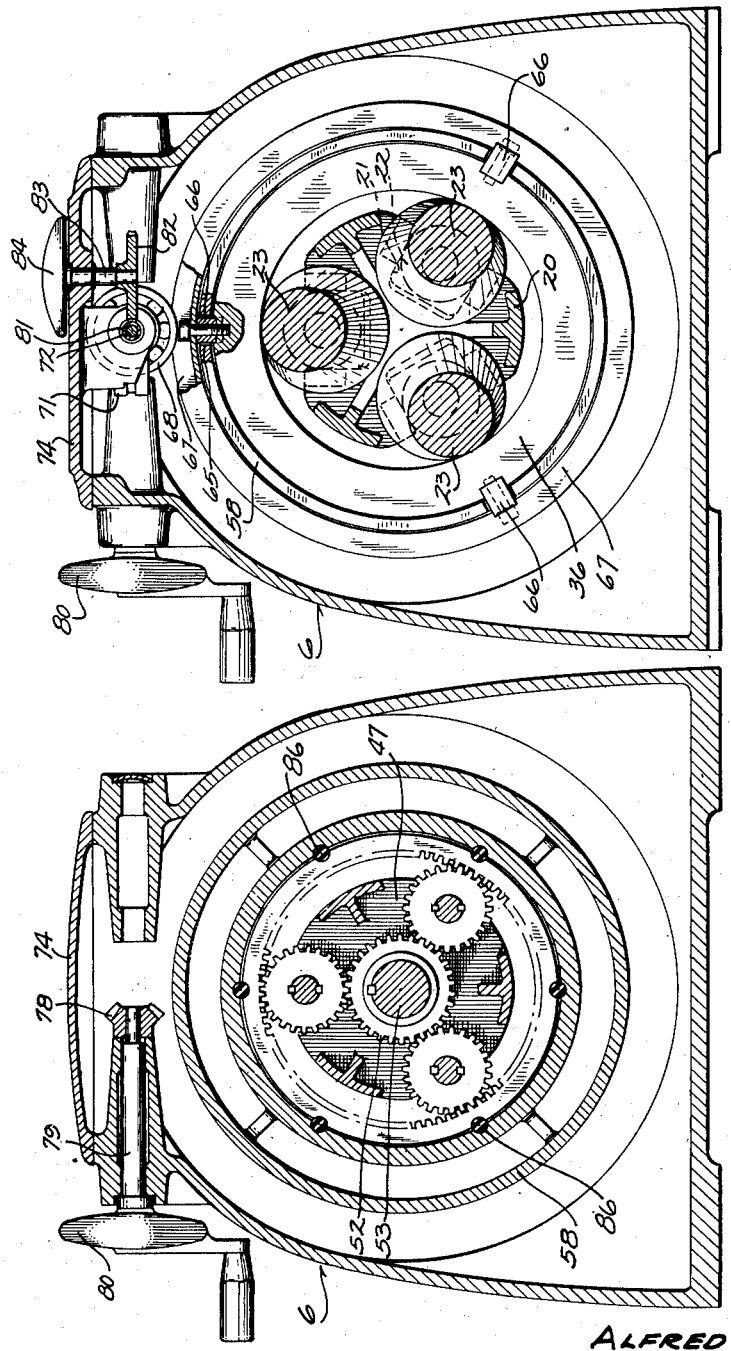

2,580,392

UNITED STATES PATENT OFFICE 2,580,392

VARIABLE-SPEED TRANSMISSION

Alfred G. Bade, Milwaukee, Wis., assignor to The Falk Corporation, Milwaukee, Wis., a corporation of Wisconsin Application November 13, 1948, Serial No. 59,818

14 Claims. (Cl. 74—796)

1

This invention relates to variable speed transmissions of the type employing a rotating cage with inclined rollers rotatable relative to the cage as planets and in which the ratio of input speed to output speed may be varied by movement of a control ring relative to the rollers.

In variable speed transmissions of the character above indicated, tapered rollers are rotatably supported in inclined position in a rotating cage, the bearings of the rollers being movable radially of the cage in slots. The inclination of the rollers is controlled by three concentric rings spaced axially of the cage. In the prior constructions, two rings are non-rotatable and one of the non-rotatable rings is movable axially of the cage and in contact with tapered surfaces of the rollers to vary the rate of planetary movement of the rollers dependent on the position of such ring, thus varying the ratio of speed transmission.

The present invention is an improvement over the device disclosed in Patent 2,353,136 issued to me July 11, 1944, in that less torque is exerted on the axially movable and speed ratio control ring which can accordingly be made much lighter and otherwise greatly simplified. The highest torque is exerted in the present application, on the gearing including roller gears 27 and ring gear 33 which is fixed in the housing and receives all the reaction forces in the present device. A more efficient structure with a greater power transmission capacity is thus obtained as compared to my patented structure.

It is, therefore, an object of the present invention to provide a simplified and rugged transmission of the indicated type, suitable for controlling the flow of relatively large amounts of power and of varying the speed at which such power is delivered. Another object of the invention is to provide a variable speed transmission of the inclined planet roller type adapted for the transmission therethrough of higher power than attempted heretofore and at speeds varying over the full range from zero to a maximum speed.

Another object of the invention is to provide a variable speed power transmission of the ring controlled planetary roller type in which the control ring varies the ratio of speed transmission of all of the power flowing through the transmission and which power is of a higher value than heretofore attempted with such transmissions.

Objects and advantages other than those above set forth will be apparent from the following

2 description when read in connection with the accompanying drawing in which:

Fig. 2 is a transverse section on the planes of broken line II—II of Fig. 1; and Fig. 3 is a transverse sectional view taken on the planes of broken line III—III of Fig. 1.

Figure 1:
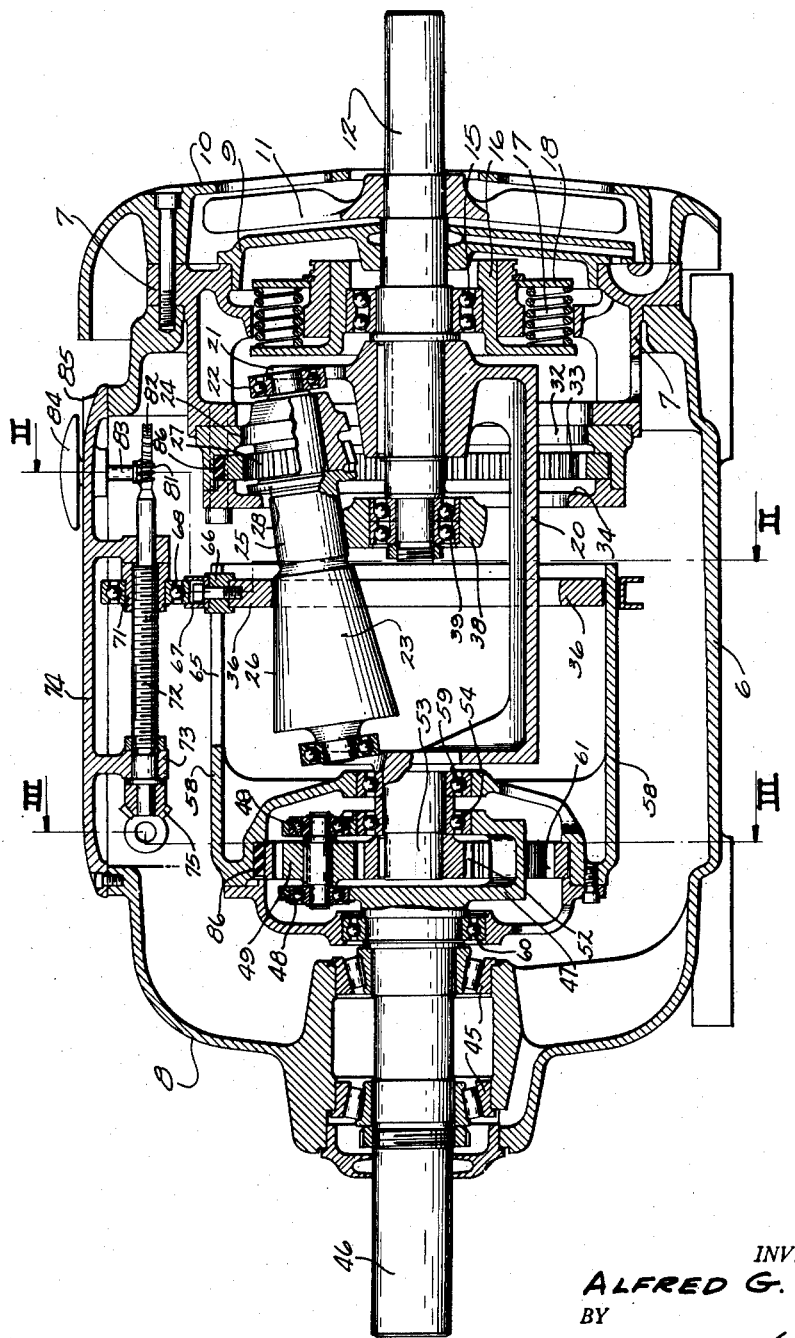
Fig. 1 is a longitudinal section on a vertical plane through the axis of a transmission embodying the present invention.

In the drawings in which like numerals are applied to like parts, a housing 6 is closed by one removably mounted end head 7, the other end closure 8 being formed integral with the housing. The end head 7 bears an oil retainer 9 co-acting with an apertured guard 10 to define a chamber having a fan 11 mounted on the driving or power input shaft 12, the chamber having peripheral passages guiding the fan discharge over portions of the housing. The shaft 12 is supported in bearings 15 mounted in a bushing 16 slidable in the end head 7 by plurality of helical springs 17 acting between the bushing 16 and a ring 18 mounted on the end head 7. The springs urge shaft 12 and the parts mounted thereon toward housing end 8 to keep the various parts in a predetermined relation.

A substantially cylindrical cage 20 is fixed on shaft 12 and has slots 21 in the ends thereof to receive pilot bearings 22 on the ends of each of a plurality (preferably three) rollers 23 to allow change in position or floating of the rollers in the cage slots in planes radially of the cage, and to allow rotation or planetary movement of the rollers relative to the cage and upon movement of the cage. The rollers are so positioned that the axes thereof are at an angle to the cage axis with the greatest radial distance between the cage axis and the several roller axes at the input end of the transmission. Peripheral points on a portion of roller surfaces in the assembled structure, define circles of the same diameter and which are centered on the cage axis.

The rollers are severally formed with conical or tapered surface portion 24, cylindrical surface portion 25 and tapered surface portion 26; with a gear toothed portion 27, and with a flange 28. The surface 24 rolls on a roller encircling ring 32, the gear teeth 27 engage with a ring gear 33 and the flange 28 rolls on a ring 34, the ring 32, the ring gear 33 and the ring 34 all being removably mounted on the end head 7 and extending therefrom into the housing. The ring 34 reacts against end thrust of the rollers to position the rollers in the axial directions thereof.

A ring 36 encircles the tapered surface portions 26 of the rollers 23 and such surface portions are urged into contact with such ring as the transmission operates. The ring 36 is movable axially of the cage 20 to control the ratio of speed transmission as will be described.

The position and the angle of inclination of the roller axes to the cage axis is determined by rings 32 and 36 in co-action with a ring 38 mounted on a bearing 39 on the inner end of input shaft 12, for rolling contact with the cylindrical roller surfaces 25. Ring 38 forms a fulcrum for each of the several rollers and rings 32 and 36 react against the tendency toward outward radial movement of the rollers due to centrifugal force on the rollers plus a wedging action of the roller 38 which is urged axially of the cage 21 by springs 17. All of the rings are slightly crowned to reduce the areas of contact thereof with the rollers, to substantially line contacts.

The housing closure 8 has a central aperture in which are mounted a plurality of bearings 45 carrying a driven or power output shaft 46 having the end thereof within the housing formed as a carrier 47 for receiving bearings 48 in which are mounted gears 49. The gears 49 (preferably three in number) engage a sun gear 52 fixed on a stub shaft 53 formed on the roller cage 20, the stub shaft 53 supporting bearings 54 on which one end of the carrier 47 rotates. A second cage 58 is mounted on bearings 59 and 60 on the stub shaft 53 and the output shaft 46, respectively, and such cage carries a ring or orbit gear 61. The gearing above described is a single train of planetary gearing for changing, and in the present instance reducing, the speed of the output shaft as compared to the input shaft speed.

Gearing cage 58 extends partially over and in concentric relation with roller cage 20 and has slots 65 therein parallel with the axis of the roller cage. Such slots severally receive sliding blocks 66 to which control ring 36 is attached. The blocks 66 are attached to a channel-shaped ring 67 encircling cage 58 and receiving the outer raceway of a bearing 68, of which the inner raceway is fixed on a non-rotatable nut 71. The nut 71 travels on a screw 72 rotatably mounted in supports 73 extending into the housing from a cover plate 74 for a top aperture in the housing.

One end of the screw 72 bears a bevel gear 75 engaging with a bevel gear 78 on a shaft 79 extending exteriorly of the housing and provided with a hand wheel 80. The other end of the screw 72 bears a worm 81 engaging with a worm wheel 82 on a stub shaft 83 mounted in the cover plate 74 and carrying an indicating dial 84 exteriorly of the housing. The dial coacts with an indicator 85 formed on the housing cover plate. When the hand wheel 80 is turned, the screw 72 rotates and nut 71 travels axially of the screw to shift the bearing 68 and the control ring 36 axially of the roller cage. The amount and direction of travel of nut 71 is shown by the dial 84 and indicator 85 for indicating the position of the ring and hence the ratio of speed transmission in effect at any given time.

It will be observed that ring gears 33 and 61 are held in spaced relation in the housing 6 and the cage 58, respectively, by a plurality of resilient members 86 which form floating mountings for the ring gears and thus equally divide the load between the several planets of the planet sets severally associated with such ring or orbit gears.

The planetary gearing is a simple and rugged train of which the sun gear rotates at input speed and the orbit gear rotates at a speed determined by the position of the control ring on the rollers. A speed range is thus obtained which is infinitely variable from zero to a maximum merely by shifting the position of the control ring. In operation, assuming that control ring 36 is in the position shown and that power is being applied to shaft 12, the cage 20 will be rotated and rollers 23 will rotate with the cage, and also relative to the cage at a speed dependent on the ratio of roller gears 27 to fixed ring gear 33. The roller planet rotation, of course, is in a direction opposite to the direction of rotation of the cage. The control ring 36 is of such diameter that the radius of the rollers at the line of ring contact thereon to the radius from such line contact to the axis of the cage 20, is in the same ratio as gears 27 are to gear 33. Ring 36 and orbit gear 61 are, accordingly, now at standstill. Hence, the speed of rotation of the output shaft 46 depends wholly on the ratio of transmission of the planetary gearing 49, 52, 61 and is at a maximum value.

However, as control ring 36 is moved toward the left, the ratio of the roller radius to the radius from the line of roller-ring contact to the cage axis 20, is reduced so that ring 36 and orbit gear 61 now rotate in a direction opposite to the rotation of cage 20 and sun gear 52. Hence, the speed of rotation of output shaft 46 is now reduced. When the ring 36 is moved to the left and larger end of rollers 23, the ratio of the above defined radii is a minimum and, due to the proportioning of the parts, the output shaft 46 is now at standstill.

The present device, accordingly, provides a first planetary system comprising a cage with planet rollers driven at constant speed and acting on a control ring driving the orbit gear of a second planetary system or planet gearing train in which the sun gear is driven by the input shaft and the planets are carried by the output shaft. The speed is varied by differential motion between the sun gear and the orbit gear of the planetary gearing, which motion is obtained by such movement of the control ring as to vary the ratio between a radius of the first planetary system and the roller-ring radius as the control ring is moved axially of such system.

Although but one embodiment of the present invention has been illustrated and described, it will be apparent that various changes and modifications may be made therein without departing from the invention as defined in the appended claims.

I claim:
1. In a variable speed transmission, a housing, an input shaft extending into and rotatably mounted in the housing, a ring gear mounted in the housing in substantially fixed relation thereto, a cage driven by the input shaft, a plurality of tapered rollers mounted in the cage and having a toothed portion engaging the ring gear, the rollers revolving with and relative to the cage as planets, a ring movable axially of the cage and peripherally contacting the rollers for rotation thereby relative to the cage, an output shaft, and a planetary gear train connecting both the cage and the ring with the output shaft for transmitting power thereto at a speed ratio dependent on the axial position of the ring.

2. In a variable speed transmission, a housing, an input shaft extending into and rotatably mounted in the housing, a ring gear mounted in the housing in substantially fixed relation thereto, a cage driven by the input shaft, a plurality of tapered rollers mounted in the cage and having a toothed portion engaging the ring gear, the rollers revolving with and relative to the cage as planets, a ring peripherally in contact with the rollers for rotation thereby relative to the cage, the ring being movable axially of the cage, an output shaft, a sun gear driven by the input shaft, planet gears carried by the output shaft, and an orbit gear driven by the ring, the said gears co-acting for transmitting power between the shafts at a speed ratio dependent on the position of the ring axially of the cage.

3. In a variable speed transmission, a housing, a stationary ring gear mounted in the housing, an input shaft rotatably mounted in and extending into the housing, a cage driven and supported by the input shaft, a plurality of tapered planet rollers rotatably mounted in the cage at an angle to the cage axis, the radial distance of the roller axes from the cage axis decreasing from the input end toward the output end of the transmission, a ring in peripheral contact with the rollers for rotation thereby, the ring being adjustable axially of the cage for varying the speed of rotation of the ring, an output shaft extending into and rotatably mounted in the housing, and a gear train connecting the cage and the ring with the output shaft for transmitting power thereto at a speed ratio dependent on the axial position of the ring.

4. In a variable speed transmission, a housing, a stationary ring gear mounted in the housing, an input shaft rotatably mounted in and extending into the housing, a cage driven and supported by the input shaft, a plurality of tapered planet rollers rotatably mounted in the cage at an angle to the cage axis, a ring in encircling contact with the rollers for rotation of the ring relative to the cage, the ring being adjustable axially of the cage for varying the speed of rotation of the ring, a cage driven by the ring, an output shaft extending into and rotatably mounted in the housing, a ring gear mounted on the ring-driven cage, a sun gear driven by the input shaft, and planet gears carried by the output shaft, the last mentioned ring gear coacting with the sun gear and the planet gears co-acting for transmitting power between the shafts at a speed ratio dependent on the position of the ring axially of the cage.

5. A variable speed transmission comprising a housing, an input shaft extending into and rotatably mounted in the housing, a ring gear mounted in the housing in substantially fixed relation thereto, a cage driven by the input shaft, a plurality of tapered rollers mounted in the cage and having a toothed portion engaging the ring gear, the rollers revolving with and relative to the cage as planets, a ring in encircling peripheral contact with the rollers and rotatable thereby, means for adjusting the ring axially of the cage for varying the speed of rotation of the ring, means connecting the ring with the adjusting means for rotation of the ring relative to the adjusting means, an output shaft, and a gear train connecting the cage and the ring with the output shaft for transmitting power thereto at a speed ratio dependent on the position of the ring axially of the cage.

6. A variable speed transmission comprising a housing, an input shaft extending into and rotating in the housing, a ring gear mounted in the housing in substantially fixed relation thereto, a cage driven by the input shaft, a plurality of tapered rollers mounted in the cage and having a toothed portion engaging the ring gear, the rollers revolving with and relative to the cage as planets, a ring encircling the rollers for rotation thereby, a nut adjustable axially of the transmission, a bearing connecting the ring with the nut for rotation of the ring relative to the nut, an output shaft, and a gear train connecting the cage and the ring with the output shaft for transmitting power to the output shaft at a speed ratio dependent on the position of the ring axially of the transmission.

7. In a variable speed transmission, the combination of a housing, an input shaft extending into and rotatably mounted in the housing, a ring gear mounted in the housing in substantially fixed relation thereto, a cage driven by the input shaft, a set of inclined rollers having tapered portions and having a toothed portion engaging the ring gear, the rollers being mounted in the cage for rotation with and relative to the cage as planets, a rotatable ring encircling said rollers and in pressure contact with the tapered portions thereof, a second cage in the housing and having longitudinal slots therein and rotatable by the ring, blocks carried by said ring and slidable in said slots to provide driving connections between said ring and said cage, a channel member carried by said blocks for rotation with said ring, and means engaged within said channel member and operable thereon to shift said ring lengthwise of said rollers to thereby vary the ratio of roller radius to ring radius and vary the rate of rotation of said ring, an output shaft, and a gear train connecting the cage and the ring with the output shaft for transmitting power to the output shaft at a speed ratio dependent on the position of the ring axially of the transmission.

8. A variable speed transmission comprising a housing, an input shaft extending into and rotatably mounted in the housing, a ring gear mounted in the housing in substantially fixed relation thereto, a cage supported and driven by the input shaft, a plurality of tapered rollers mounted in the cage and engaging the ring gear to revolve with and relative to the cage as planets, a ring encircling and rotated by the rollers, a cage to be driven by the ring, means connecting the ring with the cage to be driven thereby for rotation of the cage by the ring, an output shaft extending into and rotatably mounted in the housing, and a gear train connecting the two cages with the output shaft for transmitting power to the output shaft at a speed dependent on the position of the ring axially of the transmission.

9. In a variable speed transmission, the combination of a housing, an input shaft extending into and rotatably mounted in the housing, a ring gear mounted in the housing in substantially fixed relation thereto, a cage supported and driven by the input shaft, a set of inclined rollers having tapered portions and having a toothed portion engaging the ring gear and being mounted in the cage for rotation with and relative to the cage as planets, a rotatable ring encircling the rollers and in pressure contact with the tapered portions thereof, a second cage rotatably mounted in the housing having longitudinal slots therein, blocks carried by the ring and slidable in the second cage slots for providing driving connections between the ring and the second cage, an output shaft, and a gear train connecting both the cages with the output shaft.

10. In a variable speed transmission, a housing, an input shaft extending into and rotatably mounted in the housing, a ring gear mounted in the housing in substantially fixed relation thereto, a cage fixed on and driven by the input shaft, a plurality of tapered rollers mounted in the cage and having a toothed portion engaging the ring gear to revolve with and relative to the cage as planets, a control ring movable axially of the transmission and encircling the rollers for rotation thereby and relative to the cage, a second cage rotatably mounted in the housing and having slots therein, blocks carried by the ring and slidable in tne slots of the second cage, a channel ring fixed to the blocks, means connected with the channel ring for moving the control ring axially of the transmission, an output shaft extending into and rotatably mounted in the housing, and a gear train connecting both the cages with the output shaft for transmitting power thereto at a speed dependent on the position of the control ring axially of the transmission.

11. In a variable speed transmission, a housing, a plurality of resilient members mounted in the housing, a ring gear mounted on the resilient members, an input shaft extending into and rotatably mounted in the housing, a cage driven by the input shaft, a plurality of tapered rollers mounted in the cage, the rollers having toothed portions for engaging the ring gear to revolve with and relative to the cage as planets, a ring movable axially of the cage and peripherally contacting the rollers for rotation thereby and relative to the cage, an output shaft extending into and rotatably mounted in the housing, and a gear train connecting both the cage and the ring with the output shaft for transmitting power thereto at a speed dependent on the position of the ring axially of the transmission.

12. In a variable speed transmission, a cylindrical housing, a plurality of resilient members peripherally mounted in spaced relation on an inner surface of the housing, an internal ring gear mounted on the resilient members for movement of the ring gear relative to the housing, an input shaft extending into and rotatably mounted in the housing, a cage driven by the input shaft, a plurality of tapered rollers mounted in the cage and having a toothed portion engaging the ring gear to revolve with and relative to the cage as planets, a ring movable axially of the cage and in peripheral contact with the rollers for rotation thereby and relative to the cage, an output shaft extending into and rotatably mounted in the housing, and a gear train connecting both the cage and the ring with the output shaft for transmitting power thereto at a speed dependent on the position of the ring axially of the transmission.

13. In a variable transmission, a housing, a ring gear mounted in the housing, an input shaft extending into and rotatably mounted in the housing, a cage driven by the input shaft, a plurality of tapered rollers mounted in the cage and having a toothed portion for engaging the ring gear to revolve with and relative to the cage as planets, a ring in an encircling contact with the rollers for rotation of the ring relative to the cage, the ring being axially adjustable of the cage for varying the speed of rotation of the ring, a cage driven by the ring, a plurality of resilient members mounted in the second said cage, an orbit gear mounted on the resilient members, a sun gear driven by the input shaft, an output shaft extending into and rotatably mounted in the housing, and planet gears carried by the output shaft and meshing with the orbit and sun gears for transmitting power between the shafts at a speed ratio dependent on the position of the ring axially of the transmission.

14. In a variable transmission, a housing, a ring gear mounted in the housing, an input shaft extending into and rotatably mounted in the housing, a cage driven by the input shaft, a plurality of tapered rollers mounted in the cage and having a toothed portion for engaging the ring gear to revolve with and relative to the cage as planets, a ring in an encircling contact with the rollers for rotation of the ring relative to the cage, the ring being axially adjustable of the cage for varying the speed of rotation of the ring, a cage driven by the ring, a plurality of resilient members mounted in an inner surface of the second said cage and in spaced relation about the periphery of such surface, an orbit gear supported on the resilient members for movement of the orbit gear relative to the second said cage, a sun gear driven by the input shaft, an output shaft extending into and rotatably mounted in the housing, and planet gears carried by the output shaft and meshing with the orbit and sun gears for transmitting power between the shafts at a speed ratio dependent on the position of the ring axially of the transmission.

ALFRED G. BADE.

REFERENCES CITED

The following references are of record in the file of this patent:

UNITED STATES PATENTS

| Number | Name | Date |
| --- | --- | --- |
| 1,762,199 | Standish | June 10, 1930 |
| 2,168,274 | Schmitter | Aug. 1, 1939 |
| 2,457,431 | Bade | Dec. 28, 1948 |